(12) United States Patent
Yun

(10) Patent No.: US 6,288,755 B1
(45) Date of Patent: Sep. 11, 2001

(54) VIDEO SIGNAL PROCESSING APPARATUS

(75) Inventor: Hyung Sik Yun, Seoul (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/157,411

(22) Filed: Sep. 21, 1998

(30) Foreign Application Priority Data

Oct. 30, 1997 (KR) .................................................. 97-56500

(51) Int. Cl.[7] ...................................................... H04N 5/14
(52) U.S. Cl. ........................ 348/673; 348/678; 348/712; 382/274
(58) Field of Search ..................................... 348/625, 628, 348/629, 631, 673, 678, 683, 685, 711, 712, 910; 382/274, 266

(56) References Cited

U.S. PATENT DOCUMENTS

| | | | |
|---|---|---|---|
| 4,768,095 | 8/1988 | Wada et al. | 358/183 |
| 4,774,580 | * 9/1988 | Miyasako | 348/673 |
| 4,812,905 | * 3/1989 | Rossi | 348/712 |
| 5,041,904 | * 8/1991 | Higuchi et al. | 348/607 |
| 5,638,138 | * 6/1997 | Hickman | 348/678 |
| 5,673,355 | * 9/1997 | Strolle et al. | 348/712 |
| 5,867,228 | * 2/1999 | Miki et al. | 348/607 |

* cited by examiner

Primary Examiner—Reinhard J. Eisenzopf
Assistant Examiner—Trang U. Tran
(74) Attorney, Agent, or Firm—Fleshner & Kim, LLP

(57) ABSTRACT

A video signal processing apparatus is provided that includes a gate pulse generator and a luminance signal processing unit. The gate pulse generator detects a high frequency band in accordance with a luminance signal separated from a composite video signal and outputs a gate pulse signal. The luminance signal processing unit adjusts a contrast with regard to a high frequency band in the luminance signal in accordance with the gate pulse signal received from the gate pulse generator. The high frequency band having a large black/white comparison is detected in the apparatus from the luminance signal, and a contrast processing with regard to the luminance signal is decreased in the detected high frequency band. Thus, the video signal processing apparatus can reduce or eliminate a picture flickering in the radio frequency band.

16 Claims, 2 Drawing Sheets

FIG. 3
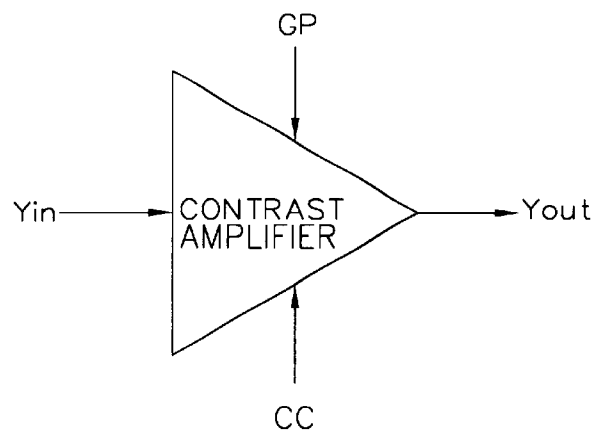
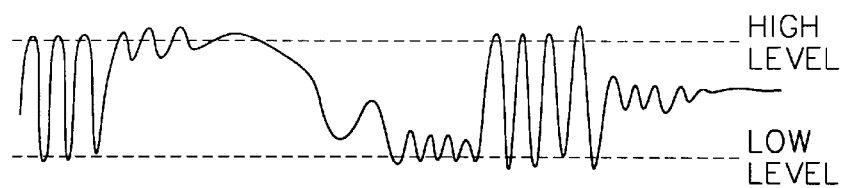
FIG.4A
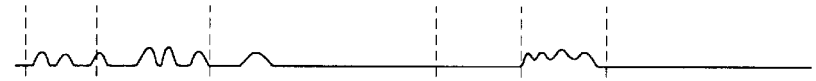
FIG.4B
FIG.4C
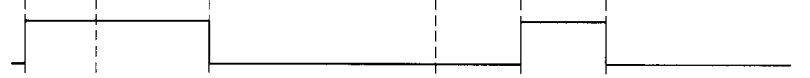
FIG.4D
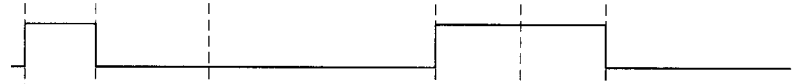
FIG.4E
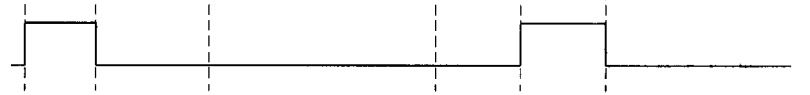
FIG.4F

VIDEO SIGNAL PROCESSING APPARATUS

BACKGROUND OF THE INVENTION

1. Field of the Invention

The present invention relates to a signal processing apparatus, and in particular, to a video signal processing apparatus.

2. Background of the Related Art

As shown in FIG. 1, a related art video signal processing apparatus is provided with a luminance signal processing unit 1 for controlling a picture status (brightness, contrast and the like) with regard to a luminance signal Y. The luminance signal Y is separated from a composite video signal in accordance with a video control signal VC.

The luminance signal processing unit 1 is connected between a video signal separating unit (not shown) for separating luminance signal Y from the composite video signal, which is outputted via an antenna and a tuner, and a matrix (not shown) for separating primary color signals R, G, B from the luminance signal Y. The video control signal VC serves to control a contrast and a brightness with regard to video signals.

The operation of the related art video signal processing apparatus will now be described. First, the video signal separating unit (not shown) separates luminance signal Y from the composite video signal received through the antenna and the tuner. The video control signal VC for controlling brightness and contrast of a screen picture is outputted from a microprocessor (not shown). The luminance signal processing unit 1 automatically controls and outputs to the matrix (not shown) a picture status (brightness, contrast and the like) with regard to a luminance signal Y separated from a composite video signal in accordance with video control signal VC. The controlled luminance signal is separated by the matrix (not shown) into the primary color signals R, G, B, which are then displayed on the picture screen.

The related art video signal processing apparatus has various disadvantages. When the luminance signal Y has a high frequency band, a large black/white comparison, and experiences a contrast processing in the luminance signal processing unit 1, a black/white comparison degree in the high frequency band may be relatively larger than other frequency bands. As a result, when the luminance signal Y is displayed on a picture screen, the high frequency band can cause a screen flickering phenomenon because of the relatively larger black/white comparison.

SUMMARY OF THE INVENTION

An object of the present invention is to provide a video signal processing apparatus that substantially obviates at least one of problems or disadvantages of the related art.

Another object of the present invention to provide a video signal processing apparatus that reduces or removes a picture screen flicker.

An object of the present invention is to provide a video signal processing apparatus that reduces a flickering phenomenon caused by a radio frequency band that enlarges a black/white comparison.

An object of the present invention is to provide a video signal processing apparatus that reduces flicker caused by a high frequency band increasing a black/white comparison by relatively decreasing a black/white comparison processing degree with regard to a detected high frequency band in a luminance signal.

To achieve at least the above-described objects in a whole or in parts, there is provided a video signal processing apparatus according to the present invention that includes a gate pulse generator for detecting a high frequency band in accordance with a luminance signal Y separated from a composite video signal and outputting a gate pulse signal, and a luminance signal processing unit for adjusting a contrast with regard to a high frequency band in the luminance signal Y in accordance with the gate pulse signal outputted from the gate pulse generator.

To further achieve the above objects in a whole or in parts, a video signal processing apparatus includes high and low level slicing units that divide a luminance signal into first and second level signals, wherein the first level signal is higher than the second level signal, first and second high frequency detectors that detect first and second high frequency bands respectively using the first and second level signals, a logic circuit that logically processes the first and second high frequency bands from the first and second detectors and determines a prescribed frequency band, and a luminance signal processing unit that reduces a contrast of the luminance signal within the prescribed frequency band relative to the luminance signal outside the prescribed frequency band.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a block diagram illustrating a luminance signal processing unit in FIG. 2; and FIGS. 4A through 4F are diagrams illustrating respective signal waveforms of FIG. 2.

DETAILED DESCRIPTION OF PREFERRED EMBODIMENTS

Figure 1:
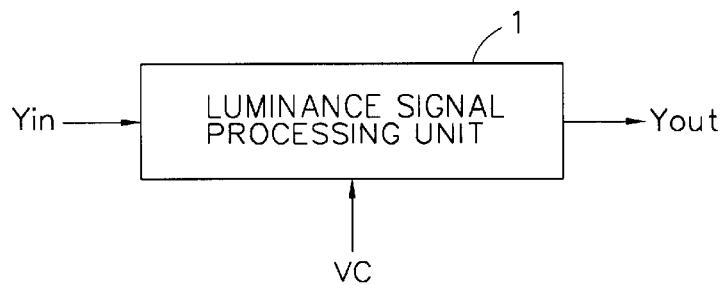
FIG. 1 is a block diagram illustrating a related art video signal processing apparatus.
Figure 2:
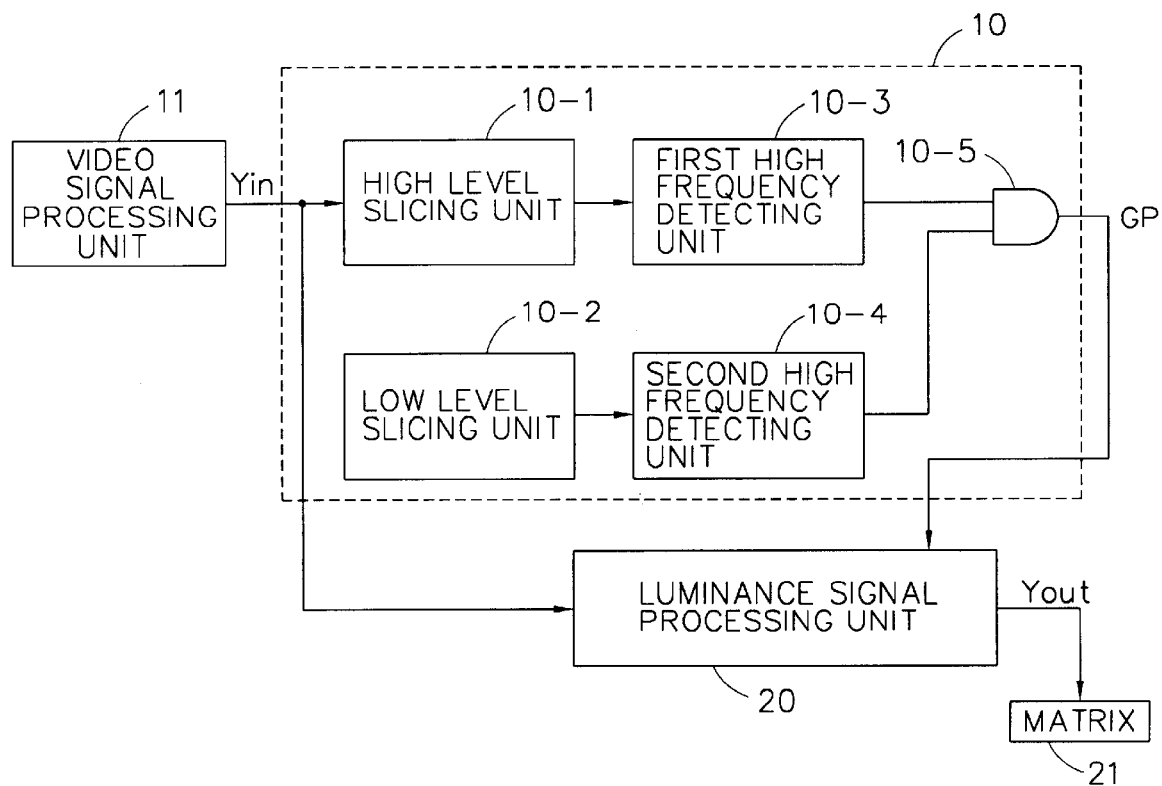
FIG. 2 is a block diagram illustrating a preferred embodiment of a video signal processing apparatus according to the present invention.

As shown in FIG. 2, a preferred embodiment of a video signal processing apparatus according to the present invention includes a gate pulse generator 10 and a luminance signal processing unit 20. The gate pulse generator 10 is for detecting a high frequency band in accordance with a luminance signal Y, which is separated from a composite video signal, and outputting a gate pulse signal GP. The luminance signal processing unit 20 is for adjusting a contrast, brightness or the like with regard to a high frequency band in the luminance signal in accordance with the gate pulse signal GP outputted from the gate pulse generator 10.

The gate pulse generator 10 includes high level and low level slicing units 10-1, 10-2 for slicing the luminance signal Y into a high level signal and a lower level signal to detect a high frequency band, which serves to enlarge a black/white comparison in the luminance signal Y. The gate pulse generator further includes first and second high frequency detectors 10-3, 10-4 for detecting only a high frequency band with regard to the signals outputted from the high level and lower level slicing units 10-1, 10-2. An AND gate 10-5 is for ANDing the signals outputted from the first and second high frequency detectors 10-3, 10-4 and outputting gate pulse signal GP to determine the high frequency band that serves to enlarge a black/white comparison. As shown in FIG. 3, the luminance signal processing unit 20 includes a contrast amplifier that amplifies the luminance signal Y in accordance with a contrast control signal CC and the gate pulse GP.

Operations of the video signal processing apparatus will now be described. When a luminance signal Yin outputted from a video signal separator 11 is applied to the gate pulse generator 10, the high level and low level slicing units 10-1, 10-2 respectively slice the luminance signal Y into a high level signal and a low level signal. The high level signal and the low level signal are respectively shown in FIGS. 4B and 4C. As shown in FIGS. 4B and 4C, only high frequency bands respectively having a large black/white comparison characteristic are detected from the luminance signal Y. The luminance signal Y is sliced into a high level signal and a low level signal to eliminate a signal band-therein, which represents a decreased or weak black/white comparison with regard to a high frequency signal.

In the sliced signals respectively output by the high level and low level slicing units 10-1, 10-2, only high frequency bands are gated using the first and second high frequency detectors 10-3, 10-4. The gated values (e.g., high frequency) are outputted in the form of pulse signals PS1, PS2 as shown in FIGS. 4D and 4E, respectively. The pulse signals PS1, PS2 are ANDed in the AND gate 10-5 so that the gate pulse signal GP is provided with a high frequency band having a large black/white comparison is determined or generated as shown in FIG. 4F.

The luminance signal processing unit 20 preferably performs a contrast processing with regard to the luminance signal Y in accordance with the contrast control signal CC when the gate pulse signal GP is in a low level. Further, the luminance signal processing 20 decreases a contrast processing of the luminance signal Y when the gate pulse signal GP is in a high level. For example, if a normal amplification degree of the luminance signal processing unit 20 is 10 when the gate pulse signal GP is in a low level, the amplification degree could be 5 when the gate pulse signal GP is in a high level.

As a result, contrast processing of the luminance signal Y is relatively decreased during the interval of the gate pulse signal GP. Thus, the magnitude of the contrast with regard to the high frequency band having a large black/white comparison becomes relatively decreased. Accordingly, when the signal outputted from the luminance signal processing unit 20 is displayed on a picture screen through the matrix (not shown) and an eccentric unit 21, a picture flickering phenomenon in a high frequency band is eliminated or reduced.

As described above, the preferred embodiment of a video signal processing apparatus according to the present invention has various advantages. The preferred embodiment of a video signal processing apparatus detects a high frequency band having a large black/white comparison from the luminance signal, and a contrast processing with regard to the luminance signal is decreased in the detected high contrast, high frequency band. Thus, the preferred embodiment of a video signal processing apparatus can eliminate a picture flickering phenomenon in the high frequency band.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A signal processing apparatus, comprising:
    a detection unit that detects a high frequency band based on an input signal and outputs a detection signal; and
    a signal processing unit that adjusts a contrast of the high frequency band in the output signal based on the detection signal, wherein the detection unit includes:
    first and second units that separates the input signal into a first level signal and a second level signal;
    first and second detectors that determine first and second pulse signals respectively using the first and second level signals; and
    a circuit that processes the respective first and second pulse signals and outputs the detection signal that determines the high frequency band.

2. The apparatus of claim 1, wherein the high frequency band has at least a prescribed black/white contrast in the luminance signal.

3. The apparatus of claim 1, wherein the first and second dividing units are high level and low level slicing units, wherein the first level signal is a prescribed amount higher than the second level signal, and wherein the first and second detectors are high frequency detectors.

4. The apparatus of claim 1, wherein the circuit is a logic gate that receives the first and second pulse signals.

5. The apparatus of claim 1, wherein the logic gate is an AND-gate.

6. The apparatus of claim 1, wherein the input signal is a luminance signal and the detection signal is a gate pulse signal, and wherein the signal processing unit comprises a contrast amplifier that adjusts the contrast of the luminance signal in accordance with a contrast control signal and the gate pulse signal.

7. The apparatus of claim 6, wherein a amplification degree of the contrast amplifier becomes relatively decreased in the high frequency band when the gate pulse signal is high level.

8. The apparatus of claim 1, further comprising:
    a video signal separating unit that receives a composite video signal and outputs the input signal; and
    a matrix unit that receives the contrast adjusted input signal from the signal processing unit and outputs respective R, G and B signals for display.

9. A video signal processing apparatus comprising:
    high and low level slicing units that divide a luminance signal into first and second level signals, wherein the first level signal is higher than the second level signal;
    first and second high frequency detectors that detect first and second high frequency bands respectively using the first and second level signals;

a logic circuit that logically processes the first and second high frequency bands from the first and second detectors and determines a prescribed frequency band; and a luminance signal processing unit that reduces a contrast of the luminance signal within the prescribed frequency band relative to the luminance signal outside the prescribed frequency band.

10. The apparatus of claim 9, wherein the luminance signal is separated from a composite video signal.

11. The apparatus of claim 9, wherein the first and second high frequency bands determine first and second-pulse signals, and wherein the logic circuit is a logic gate that receives the first and second pulse signals.

12. The apparatus of claim 9, wherein a black/white signal contrast is reduced in the prescribed frequency band to reduce flicker.

13. The apparatus of claim 9, wherein the logic circuit outputs a gate pulse signal, and wherein the luminance signal processing unit comprises a contrast amplifier that adjusts a contrast of the luminance signal in accordance with a contrast control signal and the gate pulse signal.

14. A video signal processing apparatus, comprising:

a video signal separating unit that receives a composite video signal and outputs a luminance signal;

a gate pulse generator that detects a high contrast, high frequency band based on the luminance signal and outputs a gate pulse signal, the gate pulse generator comprising, first and second units that divide the luminance signal into a high and low level signals, first and second frequency detectors that detect first and second frequency bands using respective signals outputted from the first and second units, and a logic circuit that logically processes the first and second frequency bands outputted from the first and second detectors to output the gate pulse signal;

a luminance signal processing unit that adjusts a contrast of the high frequency band in the luminance signal based on the gate pulse signal from the gate pulse generator; and a matrix unit that receives the contrast adjusted luminance signal from the luminance signal processing unit and outputs respective R, G and B signals.

15. The apparatus of claim 14, wherein the luminance signal processing unit comprises a contrast amplifier that reduces a contrast of the luminance signal in accordance with a contrast control signal and the gate pulse signal.

16. The apparatus of claim 14, wherein a amplification degree of the contrast of the luminance signal becomes relatively decreased when the gate pulse signal is high level to reduce picture flicker.

* * * * *